(12) United States Patent
Telep et al.

(10) Patent No.: US 9,353,706 B2
(45) Date of Patent: May 31, 2016

(54) ACTUATOR AND VALVE ARRANGEMENT

(71) Applicant: BorgWarner Inc., Auburn Hills, MI (US)

(72) Inventors: Robert J. Telep, Livonia, MI (US); Murray F. Busato, Clinton Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/488,700

(22) Filed: Sep. 17, 2014

(65) Prior Publication Data

US 2015/0076380 A1    Mar. 19, 2015

Related U.S. Application Data

(60) Provisional application No. 61/879,523, filed on Sep. 18, 2013.

(51) Int. Cl.
*F16K 31/04* (2006.01)
*F02M 25/07* (2006.01)

(52) U.S. Cl.
CPC ....... *F02M 25/0773* (2013.01); *F02M 25/0701* (2013.01); *F02M 25/0756* (2013.01); *F02M 25/0789* (2013.01); *F16K 31/047* (2013.01)

(58) Field of Classification Search
CPC ..... F16K 31/04; F16K 31/046; F16K 31/047; F16K 41/02; F16K 41/047
USPC ................................ 251/129.11, 129.12, 214
See application file for complete search history.

(56) References Cited

U.S. PATENT DOCUMENTS

| | | | |
|---|---|---|---|
| 3,015,963 A * | 1/1962 | Terry | 74/44 |
| 6,539,906 B2 * | 4/2003 | Rado et al. | 123/179.18 |
| 6,886,800 B2 * | 5/2005 | Fauni | B29C 45/14377 251/129.11 |
| 7,070,161 B2 * | 7/2006 | Piehl et al. | 251/65 |
| 7,104,523 B2 * | 9/2006 | Busato et al. | 251/214 |
| 7,118,114 B2 * | 10/2006 | Burdick et al. | 277/510 |
| 7,461,642 B2 * | 12/2008 | Bircann et al. | 123/568.23 |
| 2006/0081077 A1 * | 4/2006 | Spakowski et al. | 74/89.18 |
| 2009/0160275 A1 * | 6/2009 | Keefover et al. | 310/83 |
| 2014/0034029 A1 * | 2/2014 | Sasaki et al. | 123/568.26 |

\* cited by examiner

*Primary Examiner* — Matthew W Jellett
(74) *Attorney, Agent, or Firm* — BrooksGroup (57) ABSTRACT

A number of variations may include an actuator and valve arrangement.

8 Claims, 10 Drawing Sheets

FIG. 3B
(View D-D Fig 3A)

FIG. 15

ACTUATOR AND VALVE ARRANGEMENT

CROSS-REFERENCE TO RELATED APPLICATIONS

This application claims the benefit of U.S. Provisional Application No. 61/879,523 filed Sep. 18, 2013.

Figure 1:
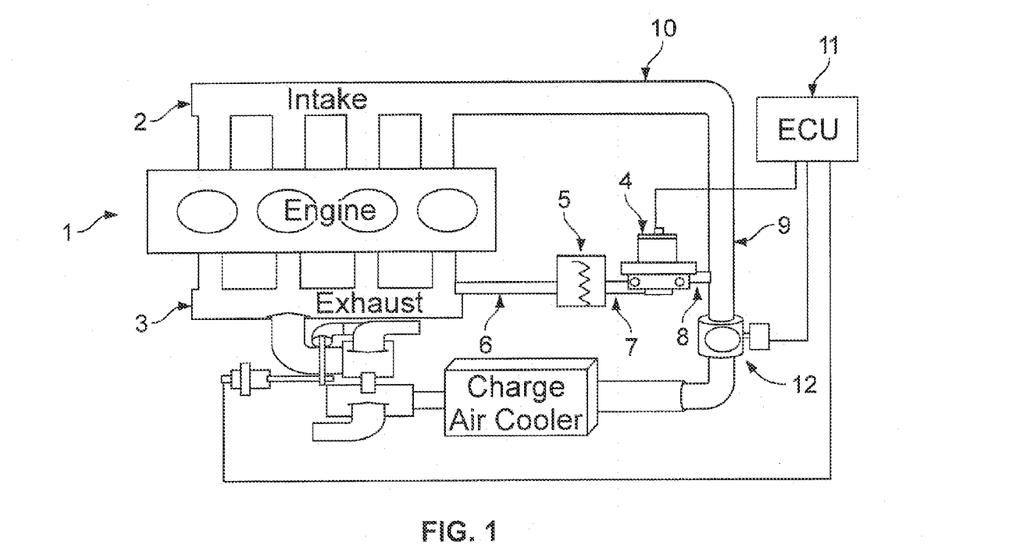
FIG. 1 is a schematic illustration of a number of variations including an engine which may have an intake manifold and an exhaust manifold.

FIG. 1 is a schematic illustrating a number of variations including an engine (1) which may have an intake manifold (2) and an exhaust Manifold (3). The EGR system may have an exhaust gas recirculation (EGR) valve (4) that controls the flow of exhaust gas to intake manifold (2). An EGR cooler (5) may be used to reduce the temperature of the exhaust gas. Conduits (6), (7), (8), (9) and (10) provide the interconnection between the exhaust manifold (3), EGR cooler (5), EGR Valve (4), and Intake manifold (2). An electrically controlled EGR valve may be provided. An electronic control unit (ECU) (11) may provide a signal that will control the opening/closing of the valve. As the EGR valve opens and closes it will increase or decrease the flow rate of exhaust gas to the intake manifold. A throttle valve (12) may be provided to control airflow into the intake manifold.

The required EGR flow rate is dependent upon several factors that include the displacement of the engine and the pressure differential between the exhaust and the intake system.

Referring again to FIG. 1, the ECU (11) may be programmed with a map of engine operating conditions and a desired EGR flow for each condition. EGR valve (4) may have a position sensor that is connected to the ECU (11) and to provide an output signal that is relative to the valve position and flow through the valve. The desired flow may be translated to a position sensor output signal and an actuator control signal. The control signal may be applied to the actuator, of the EGR valve (4), causing the valve to move away from the valve seat and allow exhaust gas to flow from the exhaust manifold (3) to intake manifold (2). The position sensor and its output signal may be part of a closed loop control system for the EGR valve. The position sensor may provide feedback to the ECU that will indicate if it has achieved the desired position and related flow. The ECU may adjust the actuator control signal to achieve-or-maintain the desired valve position. The recirculated exhaust gas will mix with the incoming air and be distributed to the engine cylinders by the intake manifold. The mixture of exhaust gas, air, and fuel will determine combustion temperature and control of the level of NOX and particulate matter.

Fuel economy may also be improved by the use an EGR system. When the EGR opens, the vacuum or pressure in the intake manifold and exhaust may be reduced. The reduction of vacuum or pressure may reduce the pumping losses of the engine the amount of fuel used by the engine.

A number of electric actuators such as linear solenoids, D.C. motors, torque motors, and stepper motors may be used to actuate the EGR valve. Valve position sensing may also be achieved by alternate methods such as, but not limited to, counting steps of a stepper motor or by regulating vacuum to a pneumatically controlled EGR valve.

A number of valve types such as throttle, poppet, or flap may be used to control the flow exhaust gas.

The type of actuator and valve may be determined, in part, by the type of engine and EGR system used for emission controls or fuel economy. For example, the exhaust from a diesel engine may contain high amounts of residue that may form a sticky lacquer like substance that may provide resistance to opening the valve. A higher force actuator, in excess of 300 N, may be required to open the valve. D.C. motor actuators with multi-stage drives have been used for these EGR valve applications.

In another example, the exhaust from a gasoline engine may contain a lesser degree of residue due, in part, to the higher exhaust temperatures and chemical reaction during combustion. The operating force of the actuator may be substantially less for these engines. Linear solenoid actuators have been used for these EGR valve applications and their typical operating forces range from 20 N to 2 N between the open and closed valve conditions.

More recent engine developments, such as GDI engines (gasoline direct injection) have made use of "cooled EGR". The faster cooling of exhaust gas may increase the level of exhaust residue that can resist the EGR valve movement and increase the requirement for actuator force. Although the level of residue is higher for these gasoline engines it may not be as severe as the residue from the diesel engine and the actuator force requirement may be less.

Several types of valves may be used for EGR applications. For example: a poppet style, flap style, or throttle style valve could be capable of providing these functions. These valves may be actuated by several different types of actuators, for example: vacuum/pressure motors, D.C. motor, torque motor, stepper motor, or linear solenoid type actuators could be capable of actuating the valve.

Figure 2:
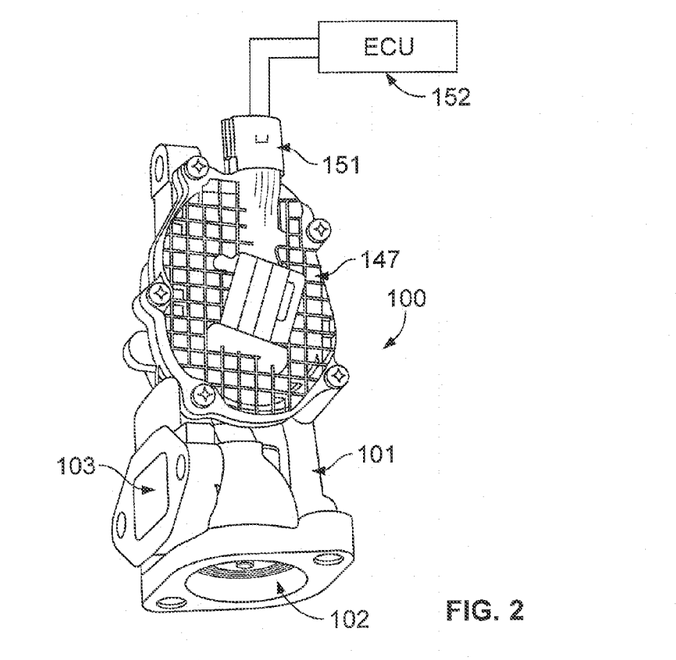
FIG. 2 shows a variation of a typical D.C. motor actuated poppet valve assembly 100.
Figures 3A, 3B:
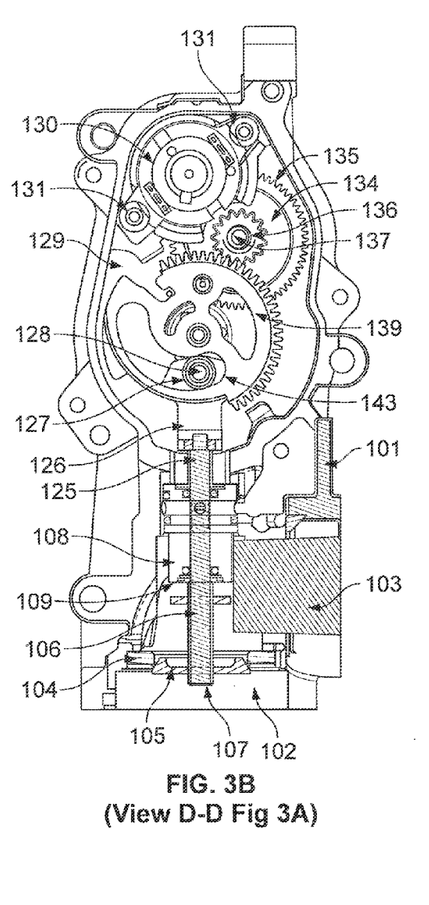
FIG. 3A is a side view of a housing having a valve seat disposed therein.
FIG. 3B is a section view taken along line D-D of FIG. 3A.
Figure 3A:
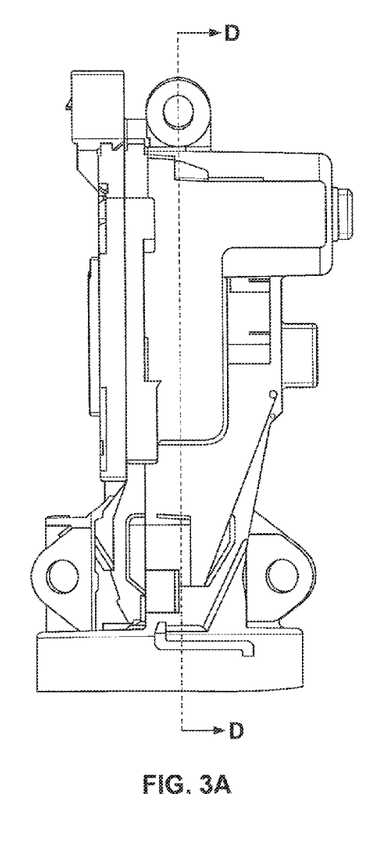

FIG. 2 shows a variation of a typical D.C. motor actuated poppet valve assembly 100. The valve assembly 100 may have a unitary actuator and valve housing 101. The housing 101 may be made of aluminum, cast iron, or other suitable material. The housing may have an inlet 102 for receiving a fluid and an outlet 103 for delivering the fluid. Referring to FIG. 3A and section view FIG. 3B, a valve seat 104 may be disposed within valve housing 101 and secured by staking, casting it in position, or other suitable means. A moveable poppet valve 105 may be coaxial with the valve seat 104 for controlling the fluid flow through the valve assembly.

The poppet 105 may be fully closed and seated on the valve seat 104 and essentially block flow between the inlet 102 and outlet 103. Poppet valve 105 may move axially away from valve seat 104 to a fully open position where maximum flow will occur between the inlet 102 and outlet 103. Poppet valve 105 may also move axially away from the valve seat 104 to a number of intermediate positions between the fully closed and fully open positions to control the rate of fluid flow at values that are less than the maximum fluid flow rate.

A valve stem 106 may be located within the housing and may be coaxial with poppet valve 105 and valve seat 104. The valve stem 106 may have a first end 107 that may connect to a central location of poppet valve 105. Poppet valve 105 may be attached to the valve stem by welding, riveting, staking or other suitable means. Valve stem 106 may be guided and supported by a bushing assembly 108 that may be coaxial with the valve stem 106 and disposed within housing 101. Referring to partial section view FIG. 4, a bushing assembly 108 may have a first end 109 with counter bore section 110 which may have multiple stepped sections 110A, 110B, and 110C having different diameters. A first stem seal 111, stem scraper 112, and retainer washer 113 may be coaxial with the valve stem 106 and disposed within the multiple stepped sections 110A, 110B, and 110C of counter bore section 110. Stem scraper 112 may be disposed in a stepped section 110B of counter bore section 110. Stem scraper 112 may have an outer diameter that is smaller than the inside diameter of stepped section 110B and may move within stepped section 110B. Stem scraper 112 will have an inside diameter that is greater than valve stem 106 but will be capable of removing unwanted debris from valve stem 106.

Figure 4:
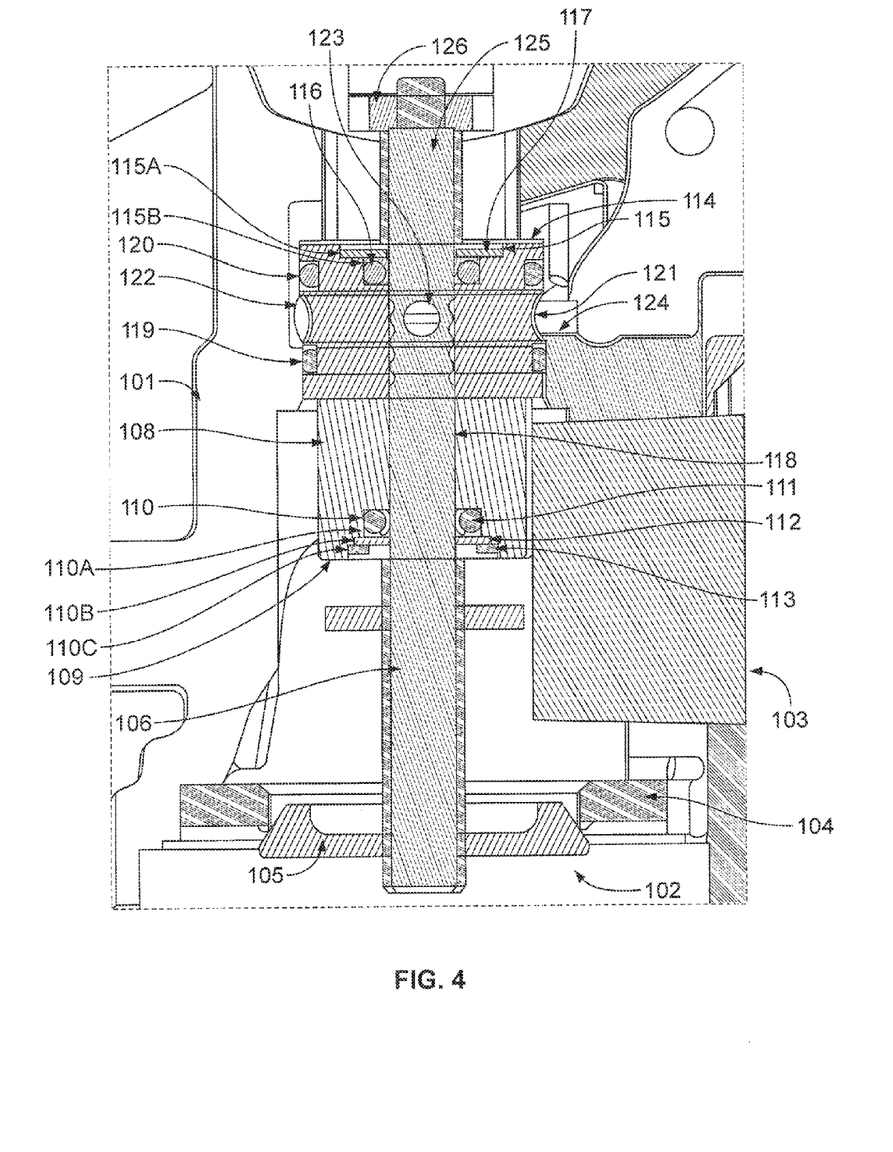
FIG. 4 is an enlarged sectional view of a valve.

Retainer washer 113 may be installed stepped section 110C of counter bore section 110 and is secured to the bushing assembly by staking or other suitable means. Retainer washer 113 may secure the stem seal 111 and stem scraper 112 in the bushing assembly 108.

Bushing assembly 108 may have a second end 114 with counter section 115 consisting of multiple stepped sections 115A and 115B. A second stem seal 116 and retainer washer 117 may be coaxial with the valve stem 106 and disposed within multiple stepped sections 115A and 115B of counter bore section 115. The retainer washer 117 may be installed in stepped section 115A of counter bore section 115 and may be secured to the bushing assembly by staking or other suitable means. Retainer washer 117 may secure the stem seal 116 in the bushing assembly 108.

The first stem seal 111 and second stem seal 116 may define a radial space 118 between the outer diameter of valve stem 106 and the inner diameter of bushing assembly 108. Radial space 118 may extend axially along a length of the bushing assembly 108 and valve stem 106 defined by the positions of stem seals 111 and 116. Stem seal 111 may prevent debris from entering space 118 from the first end 109 of bushing assembly 108 and stem seal 116 may prevent debris from entering space 118 from the second end 114 of bushing assembly 108.

Two O-ring seals 119 and 120 may be spaced axially along the outside diameter of bushing 108. Bushing 108 may have a circumferential contoured groove 121 located in the space between O-rings 119 and 120. When bushing 108 is installed in housing 101, the O-ring seals 119 and 120 may create a seal between the bushing assembly 108 and the housing 101. The circumferential groove 121 may define a space 122 between O-ring seals 119, 120, and housing 101. Contoured groove 121 may have at least one passage 123, shown as a hidden line, which will allow fluid communication between space 122 and space 118. Valve housing 101 may have a vent passage 124 that will allow fluid communication between space 122 and atmosphere. Passage 123, space 122, and vent passage 124 may allow space 118 to be essentially at atmospheric conditions. This may limit potential contamination from being forced into actuator portion 129 of valve assembly 100.

Referring to FIGS. 3B and 4, valve stem 106 may have a second end 125 extending axially through the second end 114 of bushing assembly 108. A link 126 may be attached to second 125 end of valve stem 106 by riveting, staking or other suitable means. A ball bearing 127 may be attached to link 126 by a pin 128 and may be secured by riveting, staking or other suitable means.

Figure 5:
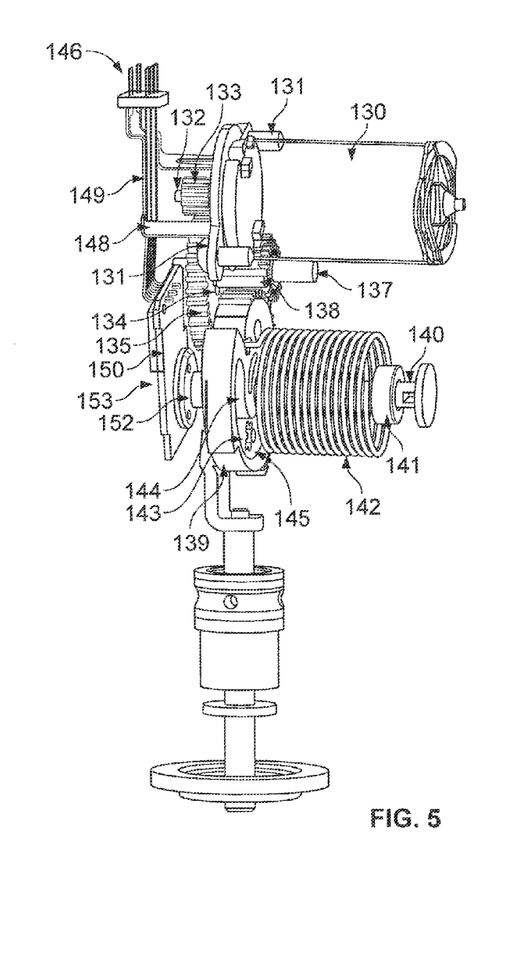
FIG. 5 is a perspective view of a valve without a housing.

Referring to FIGS. 3B, 4, and 5, housing 101 may have an actuator portion 129 for receiving the actuator components: D.C. motor 130, intermediate gear 134, Pin 137, output gear 139, Shaft 140, bearing 141, and spring 142. D.C. motor 130 may be installed into actuator portion 129 and may be retained by threaded fasteners 131. D.C. motor 130 may have a shaft 132 that is rotatable when an electrical control signal is applied to the D.C. motor. A pinion gear 133 may be attached to shaft 132 and will rotate with shaft 132. Intermediate gear 134 may have a first gear section 135 that engages and rotates with pinion gear 133. Intermediate gear 134 may also have a central through-hole 136 that may be sized to slide over pin 137. Pin 137 may be press fit into housing 101 and will allow rotation of Intermediate gear 134 about its axis. Intermediate gear 134 may have a second gear section 138 that is integrally formed as part of the intermediated gear 134.

Output gear 139 may be attached to a shaft 140 by press fit or other suitable means. The shaft 140 may be supported by at least one bearing 141 that may be installed into housing 101 and retained by press fit or other suitable means. Bearing 141 may allow rotation of the output gear 139 about the axis of shaft 140. Output gear 139 may engage the second gear section 138 of intermediated gear 134. When an electrical control signal is applied to D.C. motor 130, motor shaft 132 will rotate. Pinion gear 133, first and second gear sections 135, 138 of the intermediate gear 134, and output gear 139 may rotate in response to the application of the electrical control signal and the rotation of the motor shaft 132.

Output gear 139 may have a cam 143 integrally formed in the gear. Ball bearing 127, attached to link 126, is engaged with cam 143. There may be sufficient clearance between the cam and outside diameter of the bearing to allow relative movement. Contacting surfaces 144 and 145 of cam 143 may be eccentric with the axis of the output gear 139 therefore rotation of the output gear will cause bearing 127 to move radially with respect to the center of the output shaft 140. Since bearing 127, link 126, valve stem 106, and poppet valve 105 are interconnected; rotation of the output gear 139 in a first direction may cause the poppet valve to move away from the valve seat and rotation of the output gear 139 in a second direction will cause the poppet valve to towards the valve seat. This movement of the poppet valve 105 relative to the valve seat 104 will allow control of fluid flow through the valve between the inlet 102 and outlet 103.

The size of: pinion gear 133, first and second gear sections 135, 138 of the intermediate gear 134, and output gear 139 may provide a mechanical advantage that will increase the torque provided by D.C. motor 130. The size of the gears and shape of cam 143 will determine the overall mechanical advantage and force available to open and close the valve.

A torsion spring 142 may be coaxial with output gear 139 and shaft 140. A first end of torsion spring 142 may be engaged with output gear 139 and a second end may engage with housing 101. The bias of torsion spring 142 may be applied in manner that will cause output gear 139 to rotate in a direction that will cause poppet valve 105 to seat against valve seat 104 essentially blocking fluid flow between inlet 102 and outlet 103.

Figure 6:
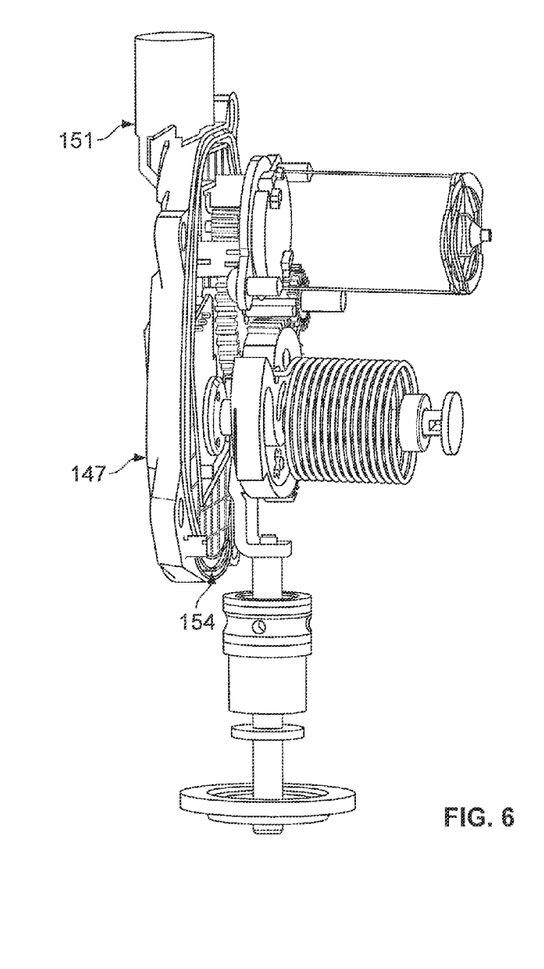
FIG. 6 is a perspective view of a valve without a housing.

Referring to FIGS. 2, 5, and 6, in a number of variations the valve assembly 100 may have a lead frame 146 imbedded in cover 147. The cover 147 may be attached to housing 101 by threaded fasteners, crimp ring, or other suitable means. A seal 154 may be located between the cover and housing to prevent debris from entering the housing. FIG. 5 shows the lead frame with cover material removed and FIG. 6 shows cover material over molded on the lead frame 146. According to a number of variations lead frame 146 may include several individual terminals. For example, terminals 148 and 149 may provide electrical connection to D.C. motor 130 and position sensor 153. A molded electrical connector 151 may be formed in cover 147. A mating connector, with terminals, may engage electrical connector 151 and the terminals of lead frame 146 and make the electrical connections to ECU 152.

The valve position and fluid flow may be controlled by a closed loop control system that may be part of and electrical control unit (ECU) 152 shown in FIG. 2. The ECU may provide a control signal to the D.C. motor 130 and receive poppet valve position feedback from position sensor 153. Each valve position may correspond to a specific position sensor output voltage. The ECU may adjust the control signal to the D.C. motor to achieve and maintain a specific valve position that corresponds to the specific valve position voltage.

The position sensor 153 may be a non-contacting type and may use magneto-resistive, inductive, Hall Effect, or other suitable technology. Sensor 153 may have a sensing circuit 150 that may receive feedback from a sensing element 152. Sensing circuit 150 may be disposed in cover 147 and connected to the lead frame 146 by soldering, contact pressure, or other suitable means. The sensing element 152 may be attached to the output gear 139, output shaft 140, or other suitable location. Sensing element 152 may provide feedback to the sensing circuit 150 when output gear 139 may be rotated in response to an electrical control signal applied to D.C. motor 130. The sensing circuit may provide a valve position voltage that corresponds to a specific gear and valve position.

It should be noted there may be a small error in actual valve position since the sensor element may be located on the gear and may be measuring the gear position. The clearance between bearing 127 and contacting surfaces 144 and 145 of cam 143 may allow some free movement of bearing 127, valve stem 106, and poppet valve 105 that may result in a small valve position error.

Valve assembly 100 is capable of high fluid flow and high valve operating forces that may be suitable for some applications. The higher capability may result in a higher cost and design complexity. Some applications may not need the higher capability or complexity. It is therefore important to "right size" an actuator and valve assembly that will be a better fit for these application.

Figure 7:
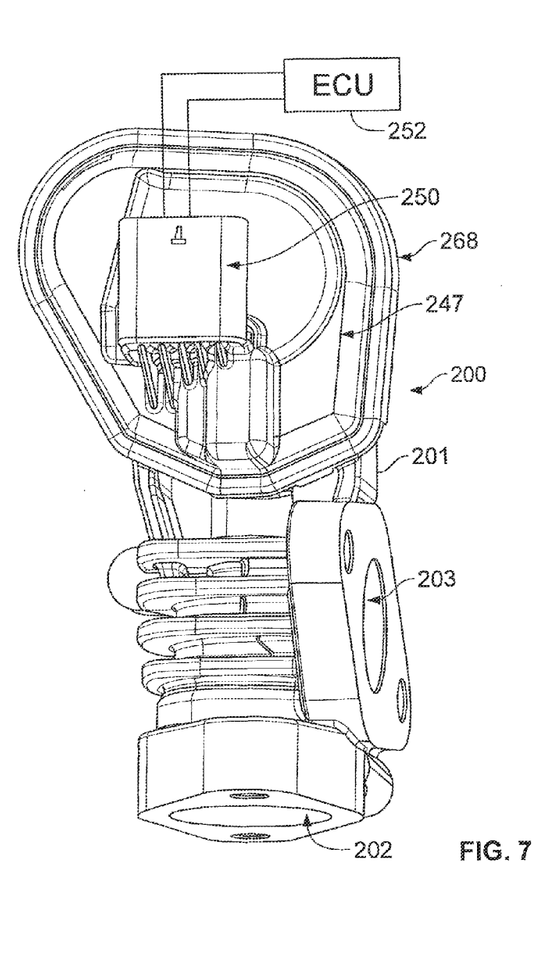
FIG. 7 shows a D.C. motor actuated poppet valve assembly.
Figure 8A:
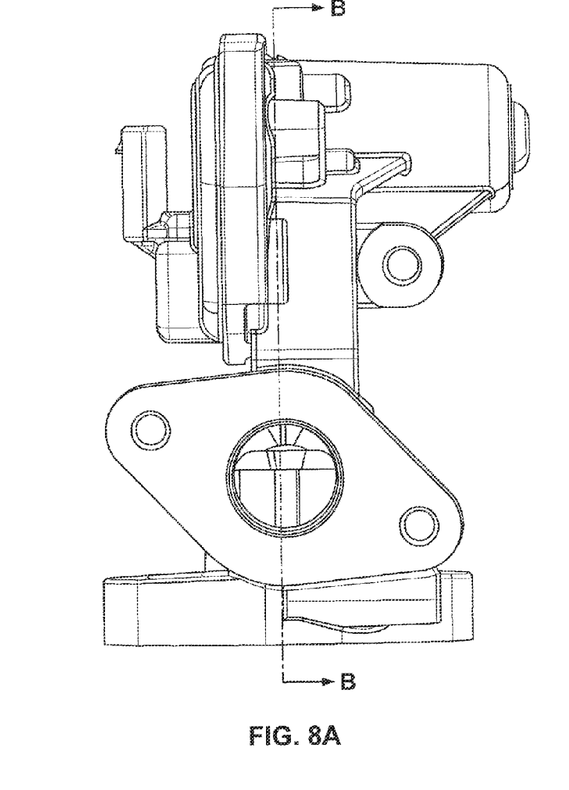
FIG. 8A is a side view of D.C. motor actuated poppet valve assembly.

FIG. 7 shows D.C. motor actuated poppet valve assembly 200. The valve assembly may have a unitary actuator and valve housing 201. The housing may be made of aluminum, cast iron or other suitable material. The housing may have an inlet 202, for receiving a fluid, and an outlet 203 for delivering the fluid. Referring to FIG. 8A and section view FIG. 8B, a valve seat 204 may be disposed within valve housing 201 and secured by staking, casting it in position, or other suitable means. A moveable poppet valve 205 may be coaxial with the valve seat for controlling the fluid flow through the valve assembly 200.

Figure 8B:
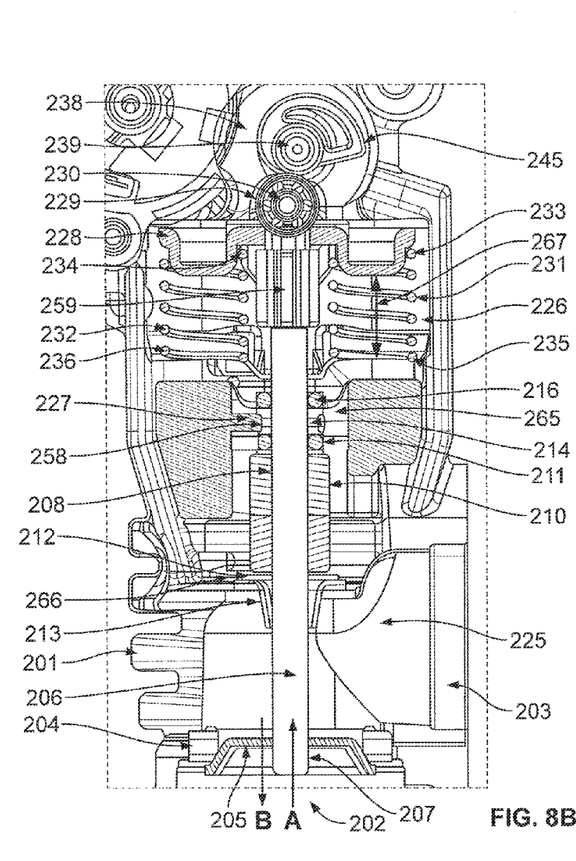
FIG. 8B is a section view taken along line B-B of FIG. 8A.

The poppet valve 205 may be fully closed and seated on the valve seat 204 and essentially block flow between the inlet 202 and outlet 203. The poppet valve 205 may move axially away from valve seat 204 to a fully open position where maximum flow will occur between the inlet 202 and outlet 203. Poppet valve 205 may also move axially away from the valve seat 204 to a number of intermediate positions between the fully closed and fully open positions to control the rate of fluid flow at values that are less than the maximum fluid flow rate.

A valve stem 206 may be located within the housing and may be coaxial with poppet valve 205 and valve seat 204. The valve stem 206 has a first end 207 that is connect to a central location of poppet valve 205. Connection may be made by welding, riveting, staking, or other suitable means. Valve stem 206 may be guided and supported by a bushing 208 that may be coaxial with the valve stem 206 and disposed within housing 201.

Figure 9:
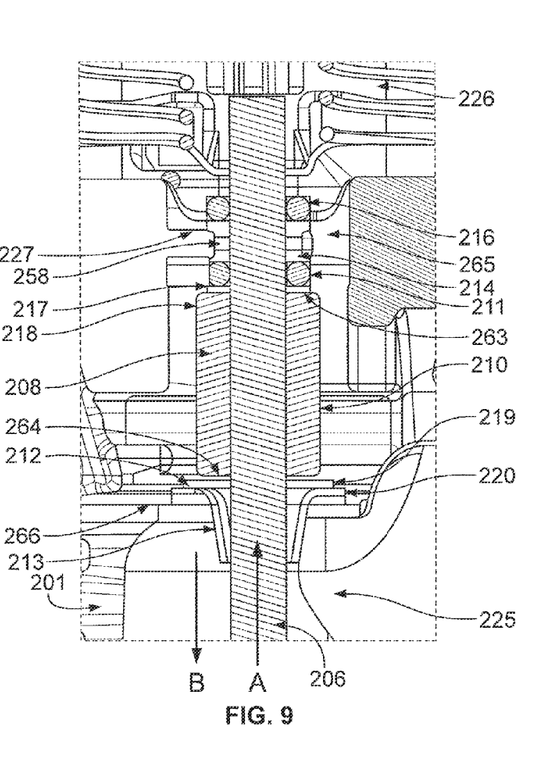
FIG. 9 illustrates a housing may have counter bore section, which may include multiple stepped sections having different diameters.

Referring to partial section view FIG. 9, housing 201 may have counter bore section 210, which may include multiple stepped sections having different diameters. A stem shield-retainer 213, stem scraper 212, bushing 208, first stem seal 211, spacer 214, and second stem seal 216 may be coaxial with the valve stem 206 and disposed within counter bore section 210. Counter bore section 210 may be designed to receive stem shield-retainer 213, stem scraper 212, bushing 208, first stem seal 211, spacer 214, and second stem seal 216 from one direction, for example, direction A shown in FIG. 8B.

Figure 10:
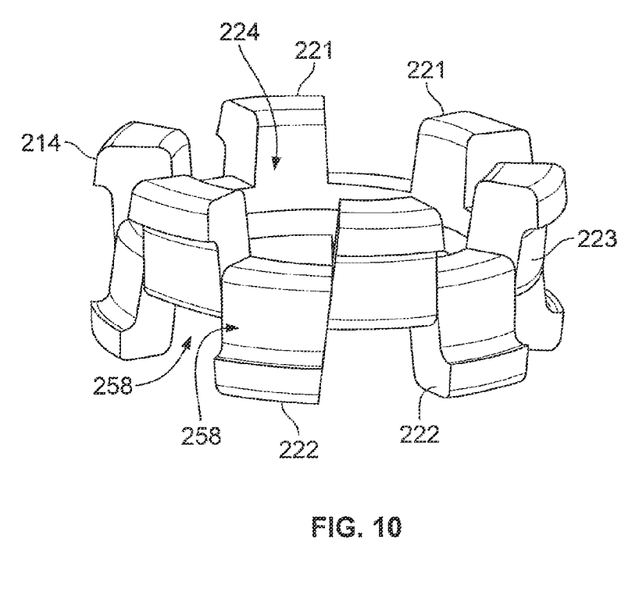
FIG. 10 illustrates a spacer that may be a generally cylindrical part and may have castellation features separated by a circumferential recess.

Referring to partial section view FIG. 9, sealing system 265 including first stem seal 211, a spacer 214, and second stem seal 216 may be disposed in a first stepped section 217 of counter bore section 210. The stem seals 211 and 216 may be spaced apart by spacer 214. Each stem seal may provide an outer radial seal to housing 201 and inner radial seal to the valve stem 206. Referring to FIG. 10, spacer 214 may be a generally cylindrical part and may have castellation features 221 and 222 separated by a circumferential recess 223. Spacer 214 also may have an inner surface 224 that has a diameter greater than valve stem 206 to allow unrestricted movement and contact. Castellation features 221, 222, inner surface 224, and circumferential recess 223 create a space 258 within housing 201. Housing 201 may have a vent passage 227, located between first stem seal 211 and second stem seal 216, that may allow fluid communication between space 258 and atmosphere. Vent passage 227 may essentially keep space 258 at atmospheric conditions in the event of small levels of leakage past either stem seal. This may limit potential contamination from being forced into either valve portion 225 or actuator portion 226 of valve assembly 200.

Referring to FIG. 8B and FIG. 9, bushing 208 may be disposed in a second stepped section 218 of counter bore section 210. Bushing 208 may have a first end 263 and second end 264 and it may be retained in the housing by staking, press fit, or other suitable means. Bushing 208 supports and guides valve stem 206 and may retain sealing system 265 including first stem seal 211, spacer 214, and second stem seal 216 in housing 201. First stem seal 211, spacer 214, and second stem seal 216 may be located at first end 263 of bushing 208. This location is further away from fluid flow through valve assembly 200 and this may be desirable when the fluid flow has a high temperature that may exceed the operating temperature of the seals.

Figure 9B:
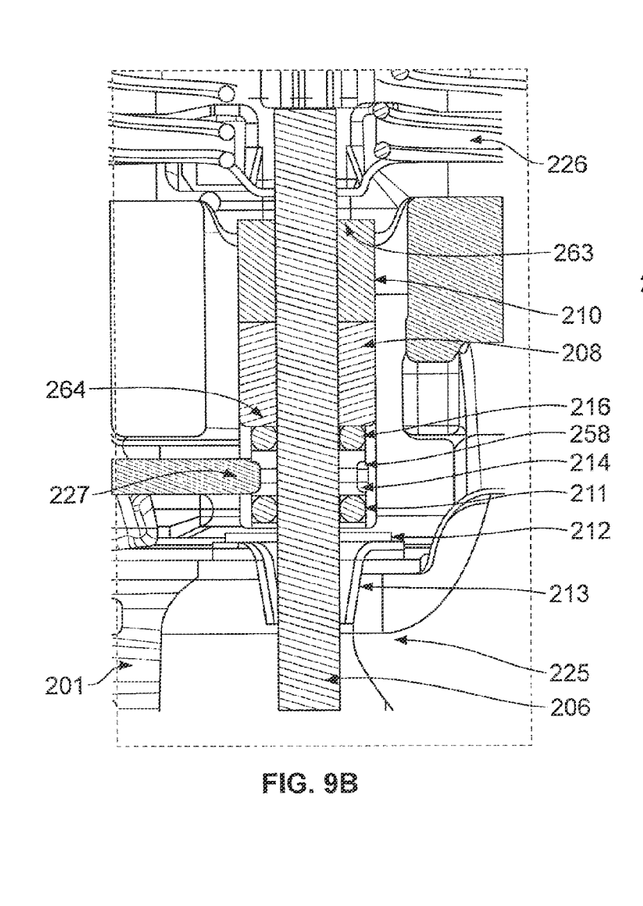
FIG. 9B is a sectional view taken along line B-B of FIG. 9.

It is also possible to locate sealing system 265 in a location closer to the fluid flow if the temperature of the fluid flow is lower and within the operating temperature of the seals. FIG. 9B shows sealing system 265 including first stem seal 211, spacer 214, and second stem seal 216 located at second end 264 of bushing 208. Referring to FIG. 9B, the numbers shown for the components and features are similar to number used for components and features used in FIG. 9. Again, referring to FIG. 9B, the location of vent 227 and space 258 may be moved to a suitable location in the area around the second end 264 of bushing 208. The multiple stepped features of counter bore 210 may be adjusted for the new seal and spacer location at second end 264 of bushing 208. Counter bore section 210 may also be designed to receive stem shield-retainer 213, stem scraper 212, bushing 208, first stem seal 211, spacer 214, and second stem seal 216, from one direction, for example, direction A shown in FIG. 9B.

FIG. 8B and FIG. 9 show anti-contamination system 266 including stem scraper 212 and stem shield-retainer 213 which may be located at second end 264 of bushing 208. Stem scraper 212 may be disposed in a third stepped section 219 of counter bore section 210. Stem scraper 212 may have an outer diameter that is smaller than the inside diameter if third stepped section 219 and may move within third stepped section 219. Stem scraper may have an inside diameter that is greater than valve stem 206 but may be capable of removing unwanted debris from valve stem 206. Stem shield-retainer 213 may be disposed in a fourth stepped section 220 of counter bore section 210. Stem shield-retainer 213 may be retained in the housing by a press fit, staking or other suitable means. Stem shield-retainer 213 may retain stem scraper 212 in housing 206 and may limit the depositing of debris on valve stem 206. It should be noted that stem scraper 212 and stem shield-retainer 213 are shown as two separate components but it is possible to combine their functions into a single component by selecting a suitable clearance between the outside diameter of valve stem 206 and the corresponding inside diameter of stem shield-retainer 213.

Valve stem 206 may have a second end 259 extending axially through second stem seal 216 into actuator portion 226. A link 228 may be disposed in housing 201 and attached to the second end 259 of valve stem 206 by threaded insert, riveting, staking, or other suitable means. Link 228 may be made of material such as injection molded plastic, die cast metal, or other suitable materials. A bearing 229 may be attached to link 228 by a pin 230 and may be secured by a press fit, riveting, staking or other suitable means.

Bias springs 231, 232 may be disposed within housing 201. First ends 233, 234 of bias springs 231, 232 may bear against stem link 228. Second ends 235, 236 of bias springs 231, 232 may bear against housing 201. The compressed force 267 of bias springs 231, 232 may cause stem link 228, valve shaft 206, and poppet valve 205 to move in direction A and seat poppet valve 205 on valve seat 204 and essentially block fluid flow between inlet 202 and outlet 203. It may be noted that although two bias springs were used in this illustrative variation, it is possible to use one spring. The spring or springs may also be located in another location. For example, a spring may be installed coaxially on the valve shaft 206 and bear against housing 201 and link 228. The location of the spring may be determined by the desired bias force, size of the spring, available space in the housing, or other factors.

Figure 11:
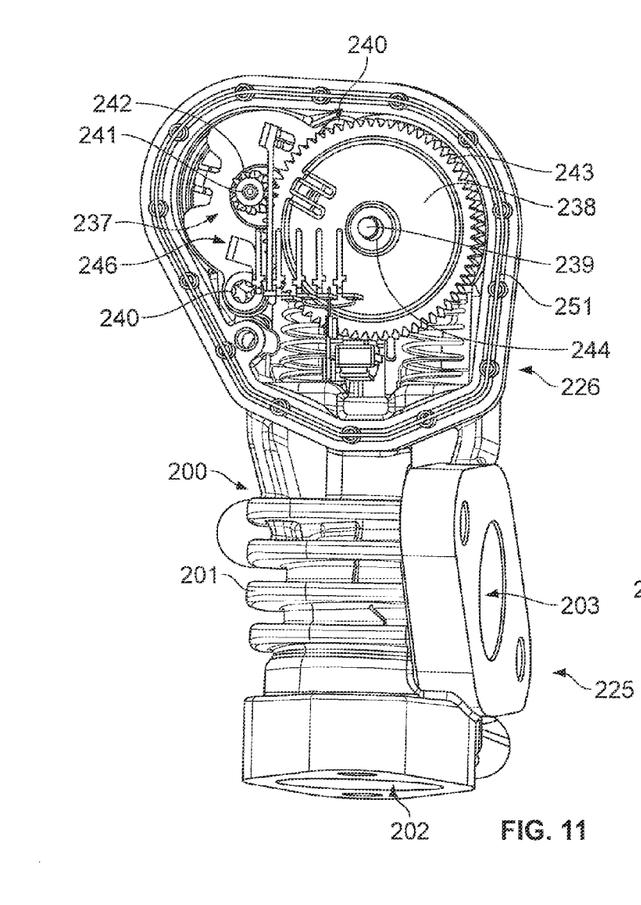
FIG. 11 illustrates a valve with portions removed.
Figure 12:
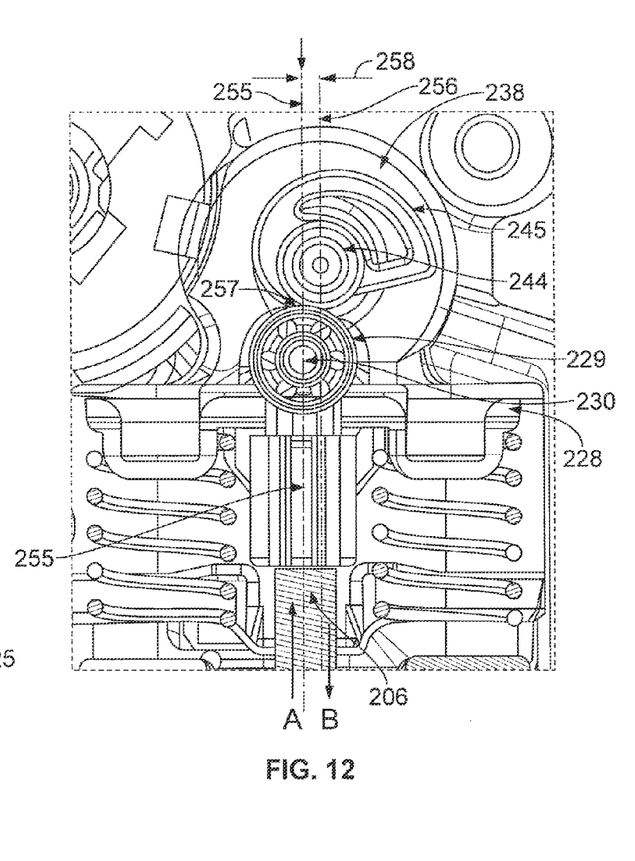
FIG. 12 is an enlarged sectional view of a valve.

Referring to FIGS. 8B, 11, and 12, housing 201 has an actuator portion 226 for receiving the actuator components: D.C. motor 237, cam-gear 238, and pin 239. D.C. motor 237 may be installed into actuator portion 226 and may be retained by threaded fasteners 240 or other suitable means.

D.C. motor 237 may have a shaft 241 that is rotatable when an electrical control signal is applied to the D.C. motor 237. A pinion gear 242 may be attached to shaft 241 and will rotate with the shaft. Cam-gear 238 has a gear section 243 that engages and rotates with pinion gear 242. Cam-gear 238 also has a central through-hole 244 that may be sized to slide over pin 239. Pin 239 may be press fit into housing 201 and may allow rotation of cam-gear 238 about its axis. Referring to FIG. 12, cam-gear 238 may have a cam portion 245 integrally formed about the central through-hole 244. Cam portion 245 may rotate with cam gear 238.

Referring to FIGS. 8B and 12, bearing 229, attached to stem link 228, may be positioned in relation to cam portion 245. The force of bias springs 231, 232 may cause stem link 228 and bearing 229 to move in direction A towards cam portion 245 and, under some conditions, may cause bearing 229 to bear against cam portion 245. When an electrical control signal is applied to D.C. motor 237, it may rotate the D.C. motor in a first direction causing shaft 241, pinion gear 242, cam-gear 238, and cam portion 245 to rotate and bear against bearing 229. The torque and force developed by D.C. motor 237, pinion gear 242, cam-gear 238, and cam portion 245 may be sufficient to overcome the compressed force 267 of bias springs 231,232, and cause bearing 229, stem link 228, valve stem 206, and poppet valve 205 to move in direction B and unseat poppet valve 205 from valve seat 204 and allow fluid flow between inlet 202 and outlet 203. The bias springs 231, 232 may compress in height as poppet valve 205 is displaced away from valve seat 204. The compressed force 267 may increase as the compressed height of bias springs 231, 232 decreases.

The axial displacement of poppet valve 205 from valve seat 204 may in part be determined by the intensity level of the control signal applied to the D.C. motor 237. A higher intensity level may generally increase the force that will overcome the compressed force 267 of bias springs 231,232 and increase the axial displacement between the poppet valve 205 and valve seat 204. A lower intensity level may generally decrease the force opposing compressed force 267 of bias springs 231,232. The energy stored in bias springs 231,232, may cause bearing 229 to bear against cam portion 245 and force cam portion 245, cam gear 238, pinion gear 242 and shaft 241 to a position that may reduce the axial displacement between the poppet valve 205 and valve seat 204. If the valve is open, and the electrical control signal to the D.C. motor 237 is interrupted, the compressed force 267 of bias springs 231, 232, may generally cause bearing 229 to bear against cam portion 245 and force cam portion 245, cam-gear 238, pinion gear 242 and shaft 241 to a position that will seat poppet valve 205 on valve seat 204 and essentially block fluid flow between inlet 202 and outlet 203.

Figure 13:
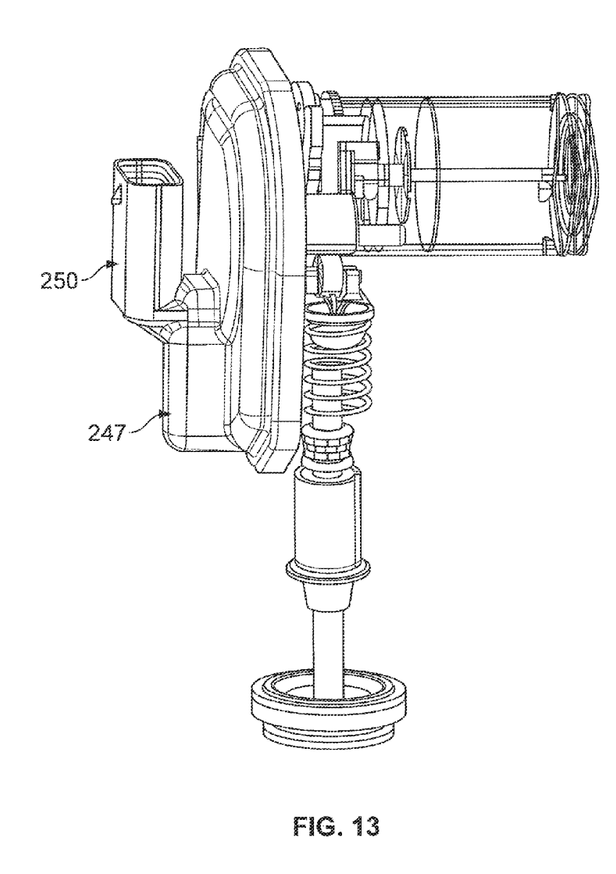
FIG. 13 illustrates a cover material over molded on the lead frame.
Figure 14:
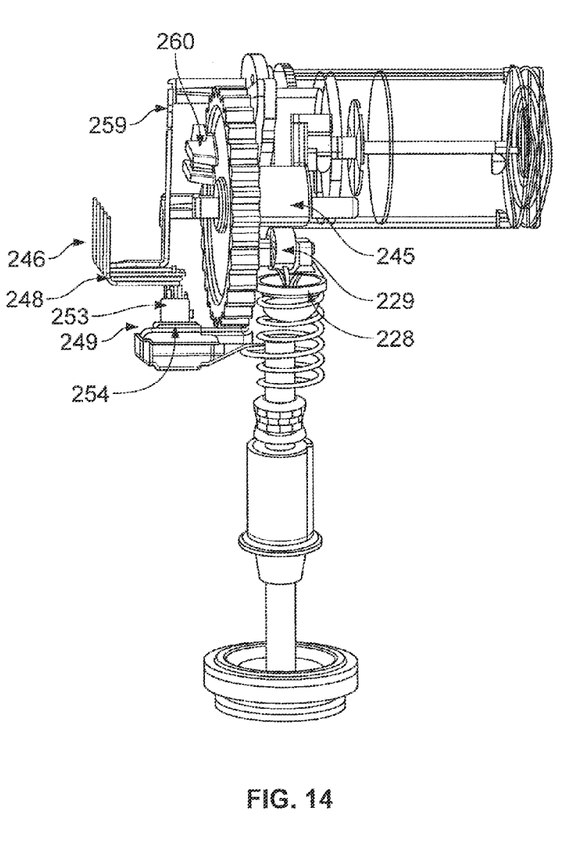
FIG. 14 illustrates the lead frame with cover material removed.

Referring to FIGS. 7, 11, 12, 13 and 14, valve assembly 200 has a lead frame 246 imbedded in cover 247. The cover 247 may be attached to housing 201 by crimp ring 268, threaded fasteners, or other suitable means. A seal 251 may be located between the cover and housing to prevent debris from entering the housing. FIG. 14 shows the lead frame 246 with cover material removed and FIG. 13 shows cover material over molded on the lead frame 246. The lead frame 246 may include several individual terminals, for example terminals 259 and 248 may provide electrical connection to D.C. motor 237 and a position sensor 249. A molded electrical connector 250 is formed in cover 247. A mating connector, with terminals, may engage electrical connector 250 and the terminals of lead frame 246 and make the electrical connections to an electrical control unit (ECU) 252.

The valve position and fluid flow may be controlled by a closed loop control system that may be part of an ECU 252 shown in FIG. 7. The ECU 252 may provide a control signal to the D.C. motor 237 and receive a poppet valve position feedback signal from position sensor 249. Position feedback signal is typically a position sensor output voltage. Each valve position will correspond to a specific position sensor output voltage. The ECU 252 may adjust the control signal to the D.C. motor to achieve and maintain a specific valve position that corresponds to the specific valve position sensor output voltage. For some conditions is may be desirable not to have bearing 229 bear against cam portion 245. For example, to ensure poppet valve 205 is completely seated on valve seat 204, it may be desirable to apply an electrical control signal to the D.C. motor that will cause D.C. motor 237, cam-gear 238, and cam portion 245 to rotate to a position that prevents cam portion 245 from contacting bearing 229. This may ensure poppet valve 205 is completely seated on valve seat 204. During this condition, there will be no force applied to the cam-gear 238 or cam portion 245 and it may move or cause unwanted noise during conditions such as high vibration. It may be desirable to apply an electrical control signal to the D.C. motor 237 that will cause the cam-gear 238 to rotate to a position where a physical stop 260, formed in cam-gear 238, engages a physical stop in the cover 247, housing 201, or other suitable valve assembly component. The intensity level of the electrical control signal can be adjusted based upon factors such as the level of vibration or other factors. This electrical control signal may be referred to as a "holding" signal.

The position sensor 249 may be a non-contacting type and may use magneto-resistive, inductive or Hall Effect technology. Sensor 249 may have a sensing circuit 253 that will receive feedback from a sensing element 254.

Figure 15:
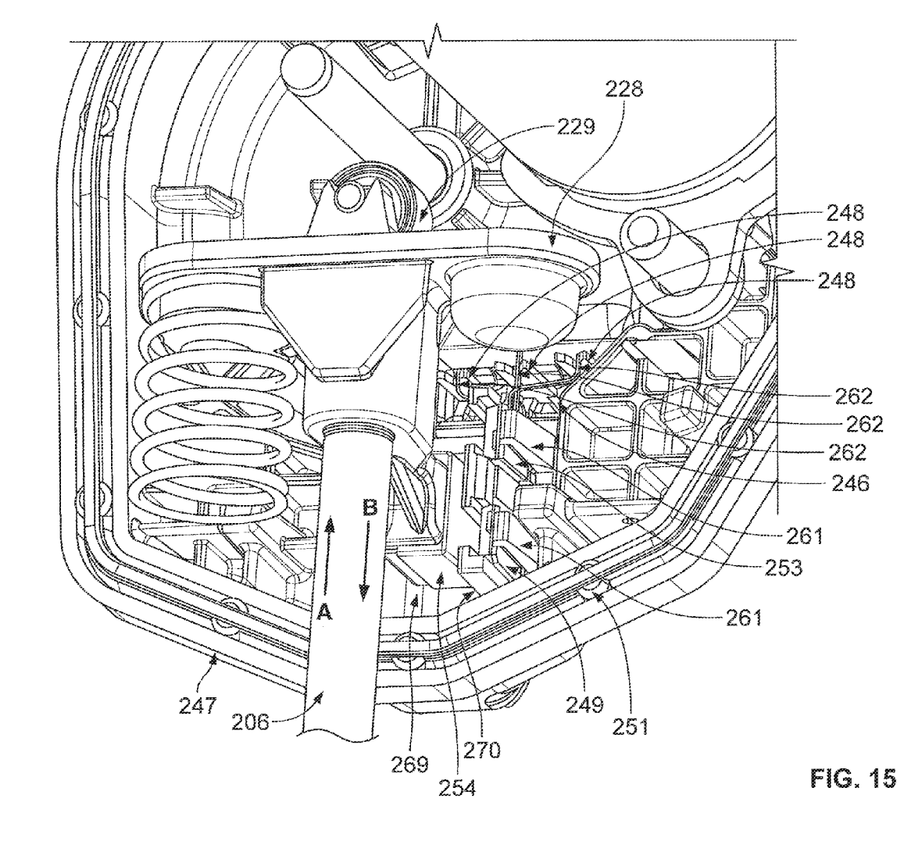
FIG. 15 illustrates one variation of an enlarged section of cover with position sensor.

FIG. 15 shows one variation of an enlarged section of cover 247 with position sensor 249. Sensing circuit 253 may be attached to the cover 247 by snap retention features 261, heat staking, metal clips, overmolding or other suitable means. Sensor circuit leads 262 may be connected to the terminals 248 of lead frame 246 by welding, soldering, contact pressure, or other suitable means. It should be noted position circuit 253 is an integrated circuit that does not require a printed circuit boards, resistor, capacitors or other components.

The sensing element 254 may be attached to the stem link 228, valve stem 206, or other suitable location. For example, the sensing element 254 in valve assembly 200 may be a permanent magnet that may be over molded into link 228. Sensing element 254 must be spaced within a specific location of sensing circuit 253. Cover 247 has first a first surface 269, that will locate and limit sensing element 254 in a first direction, and a second surface 270 that will locate and limit sensing element 254 in a second direction. Sensing element 254 may provide a sensing parameter that will be measured by sensing circuit 253. The sensing circuit may measure the variable parameter, such as a variable magnetic field or magnetic field direction, when valve stem 206 is moved, in directions A and B, in response to an electrical control signal applied to D.C. motor 237. The sensing circuit will provided a valve position voltage that corresponds to a specific valve position.

It may be noted this sensing arrangement will provide actual valve position since the sensor element 254 is attached to link 228 and it is moving with valve stem 206 and poppet valve 205. This would be considered an advantage over the position sensing arrangement used for valve assembly 100 where the position sensor measures the position of the output shaft and an implied valve position is determined.

A number of variations may be directed to the physical relationship of the cam portion 245, bearing 229, and valve stem 206. Referring to FIG. 12, the center of bearing 229 may be aligned with the longitudinal central axis 255 of valve stem 206. The central axis 256 of cam portion 245 may have been offset 258 from the longitudinal central axis 255 by an amount that will cause the force, transmitted by the cam portion 245 to bearing 229, to be applied essentially along the longitudinal central axis 255 of valve stem 206. The point of contact between the cam portion 245 and bearing 229 is shown as point 257 in FIG. 12. This point is essentially on the longitudinal central axis 255 of valve stem 206. Applying the force directly along the longitudinal central axis 255 of valve stem 206 may minimize radial forces on the valve stem that may cause friction and reduce the axial force applied to valve stem 206. The offset may be 0.5 mm to 2.0 mm or another value dependent in part by the size and shape of the cam portion 245.

What is claimed:

1. A product comprising:
   an actuator and valve portion;
   at least one housing for containing and supporting the actuator and valve portion;
     the housing including a first port for receiving a fluid, and a second port for delivering the fluid;
   a valve seat disposed between the first port and second port;
   a valve member coaxial with the valve seat for controlling flow through the valve seat;
   a valve stem having a longitudinal axis and supported in the housing for providing for axial movement; the valve stem having a first end attached to the valve member,
   a stem link operably connected to a second end of the valve stem, and moveable with the valve stem and valve member;
   a position sensor including a sensing circuit and sensor element; the sensor element providing a parameter that is measured by the sensing circuit and the sensing circuit providing a position sensor parameter indicating position;
   an actuator portion including a motor having a rotatable shaft and pinion gear;
   a cam-gear supported in the housing and having a central axis of rotation and; including an integrated cam portion formed about the central axis of rotation,
   the motor being constructed and arranged to rotate the cam-gear and integrated cam portion so that the integrated cam portion operably transmits a force to the stem link and the valve stem, causing the stem link, the valve stem, and valve member to move and;
   wherein the sensor element is attached to the stem link and; the position sensor circuit senses a parameter of the sensor element and; the sensor circuit provides a sensor output parameter that indicates the actual position of the valve member.

2. The product of claim 1 wherein the parameter of the sensor element is a magnetic field strength or magnetic field direction;
   and wherein the magnetic field strength or magnetic field direction changes with the position of the valve member.

3. The product of claim 1 wherein the sensor element is a permanent magnet operably connected to the stem link.

4. The product of claim 1 further comprising a spring bias system including at least one spring that is in operable contact with the stem link and;

wherein, when the motor having the rotatable shaft and pinion gear, rotates the cam-gear and cam portion in a first direction, the cam portion will force stem link, valve stem, and valve member to move in a first direction and; the bias spring system will compress and provide a compressed force and;

wherein, when the motor, with a rotatable shaft and pinion gear, rotates the cam-gear and cam portion in a second direction, the compressed force of the bias spring system, and not the cam, will move the stem link, valve stem, and valve member in a second direction, wherein a torsion spring is operatively connected to the cam-gear.

5. The product of claim 4, wherein the bias spring system comprises at least two springs.

6. The product of claim 1 further comprising a sealing system comprising;
first and second seals coaxial with the valve stem and providing a radial seal to the valve stem,
a spacer coaxial with the rotatable shaft and providing an axial spacing and a sealed space between the first and second seals,
a vent located in the housing and; in fluid communication with the sealed space and;
wherein the first and second seals provide for sealing of the actuator portion from the valve portion and; the vent will provide for fluid communication of first and second seal leakage to atmosphere.

7. A product comprising:
an actuator and valve portion;
at least one housing for containing and supporting the actuator and valve portion;
the housing including a first port for receiving a fluid, and a second port for delivering the fluid;
a valve seat disposed between the first port and second port;
a valve member coaxial with the valve seat for controlling flow through the valve seat;
a valve stem having a longitudinal axis and supported in the housing for providing for axial movement; the valve stem having a first end attached to the valve member,
a stem link operably connected to a second end of the valve stem, and moveable with the valve stem and valve member;
a position sensor including a sensing circuit and sensor element; the sensor element providing a parameter that is measured by the sensing circuit and the sensing circuit providing a position sensor parameter indicating position;
an actuator portion including a motor having a rotatable shaft and pinion gear;
a cam-gear supported in the housing and having a central axis of rotation and; including an integrated cam portion formed about the central axis of rotation,
the motor being constructed and arranged to rotate the cam-gear and integrated cam portion so that the integrated cam portion operably transmits a force to the stem link and the valve stem, causing the stem link, the valve stem, and valve member to move and;
wherein the sensor element is attached to the stem link and; the position sensor circuit senses a parameter of the sensor element and; the sensor circuit provides a sensor output parameter that indicates the actual position of the valve member, and further comprising a spring bias system comprising a first spring and a second spring, each of the first spring and second spring having a first end and a second end, first end bearing against the stem link and the second end bearing against the housing.

8. A product as set forth in claim 1 wherein the stem link comprises injection molded plastic.

* * * * *